Sept. 16, 1952  J. A. ROMANO  2,610,555
METHOD FOR PRODUCING SHINGLE STOCK
Filed May 27, 1946  3 Sheets-Sheet 1
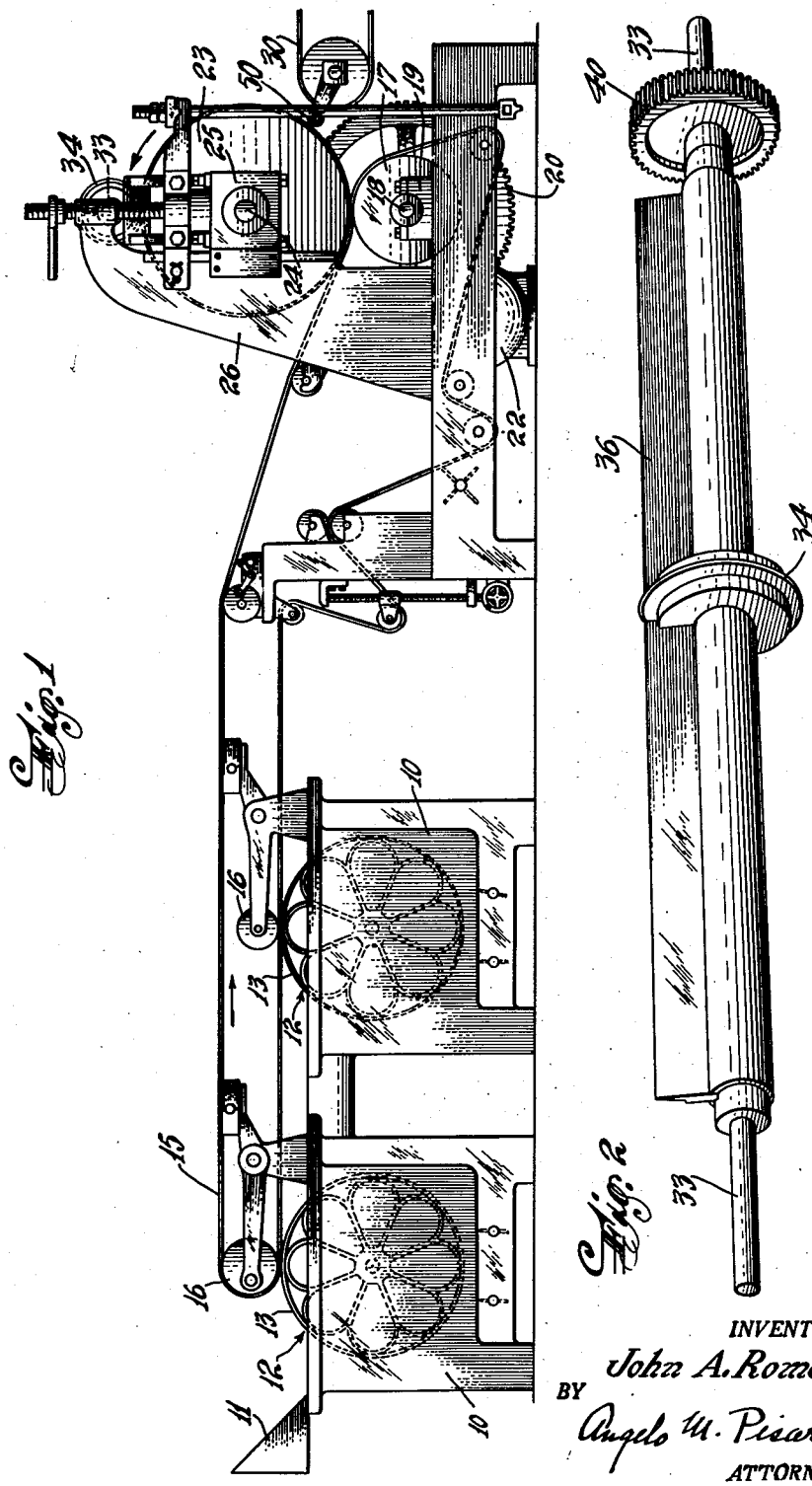
INVENTOR.
John A. Romano
BY
Angelo M. Pisarra
ATTORNEY Sept. 16, 1952 J. A. ROMANO 2,610,555
METHOD FOR PRODUCING SHINGLE STOCK
Filed May 27, 1946 3 Sheets-Sheet 2
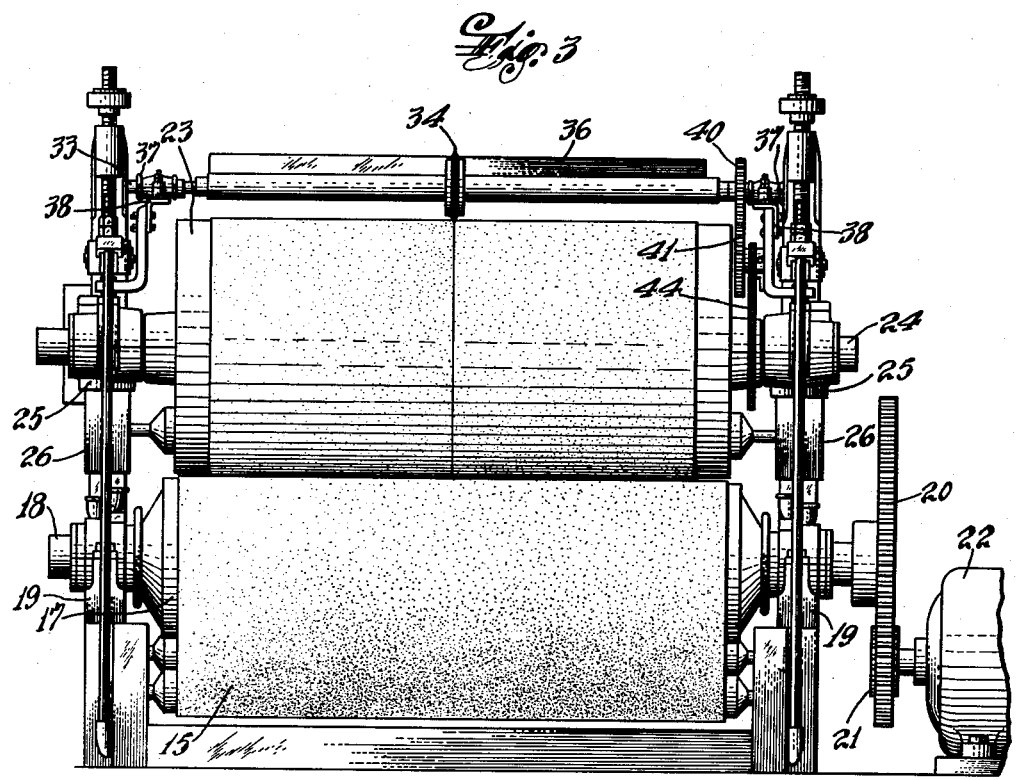
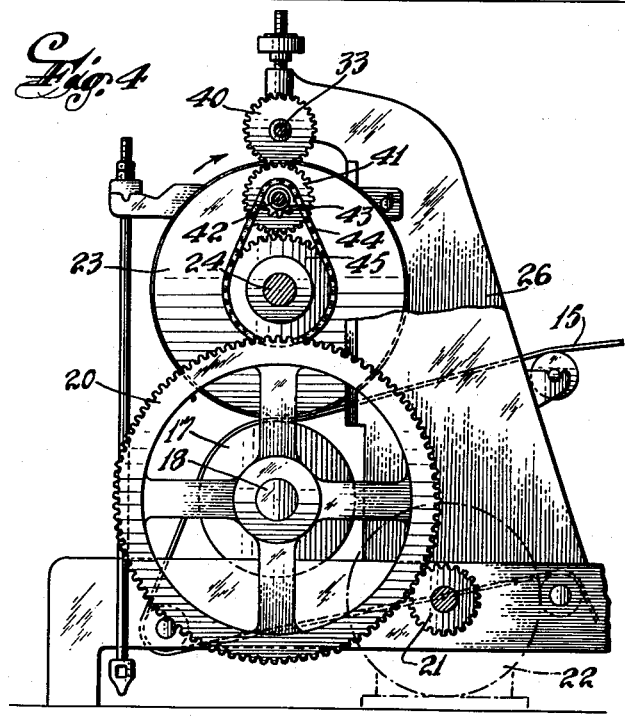
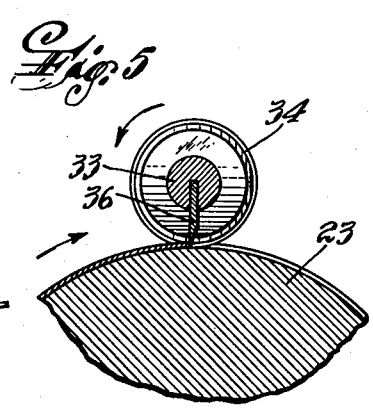
INVENTOR.
John A. Romano
BY Angelo M. Pisarra
ATTORNEY Patented Sept. 16, 1952

2,610,555

UNITED STATES PATENT OFFICE 2,610,555

METHOD FOR PRODUCING SHINGLE STOCK

John A. Romano, Berkeley Heights, N. J.

Application May 27, 1946, Serial No. 672,680

2 Claims. (Cl. 92—67)

This invention relates to novel methods and apparatus for making asbestos shingle stock or any other similar material generally formed by the accumulation of successive layers of wet material.

In the art, it has been common practice to form a mixture of fibrous material, such as asbestos fibers, and a cementitious or bonding material such as cement. Such a mixture in the wet condition is transferred to an endless band and is carried thereon as a relatively thin layer or web of wet asbestos-cement mixture. The layer of said asbestos-cement mixture is transferred onto a rotating accumulating roll until the desired thickness is obtained whereupon it is stripped from the roll and transferred to a cutting table. While on the cutting table, the wet sheet of said asbestos-cement mixture is cut into units of the same size and shape. These units are then removed from said table, stacked and subjected to the next operation which generally is the drying operation.

In the employment of said prior art machines, it has been customary to employ two men for cutting and stripping the wet asbestos-cement board from the accumulating roll and guiding it onto the table for cutting. The wet board is then saw-cut by two men and the resultant units are lifted and stacked on skids. This prior art method and apparatus for producing said units has a number of disadvantages, among which are the following:

(1) When the boards are stripped from the accumulating roll, many of them are broken because of their low-tensile strength in the wet condition. The loss generally is between 20% to 40% of those produced on said roll.

(2) An appreciable percentage of the boards which are in the whole condition as they are stripped off of the accumulating roll are broken as they are dragged along the cutting table to cutting position.

(3) The saws employed in cutting the board must be sharpened every eight hours and must be replaced about every month.

(4) When the boards are saw cut, there is generally sawdust between them, and when these units are calendered the loose dust is pressed into the grain of the faces of these units resulting in "spotty" or dirty units.

The main object of this invention is to greatly reduce and at least in part to obviate some of the aforesaid disadvantages.

A specific object of this invention is to provide novel apparatus for making individual stock units of the asbestos-cement type.

Another object of this invention is to provide novel apparatus for increasing the production of said units and thereby reducing the cost thereof.

Another object of this invention is to provide novel apparatus for the production of these units, whereby the amount of manual labor for their production is decreased.

Another object of this invention is the elimination of the saw-cutting operations.

Another object of this invention is to provide a novel method for producing said units.

These as well as other objects and advantages of this invention will at least in part be obvious from the accompanying drawings, wherein;

Fig. 1 is a side view of a wet machine embodying my invention.

Fig. 2 is a perspective view of a dual cutting device employed in the practice of this invention.

Fig. 3 is a front view of the machine shown in Fig. 1.

Fig. 4 is a fragmentary side view of a portion of the machine shown in Fig. 1.

Fig. 5 is a fragmentary sectional view showing the relationship of the cutting device to the layer of web material on the accumulating roll at a particular stage of operation.

Figure 6:
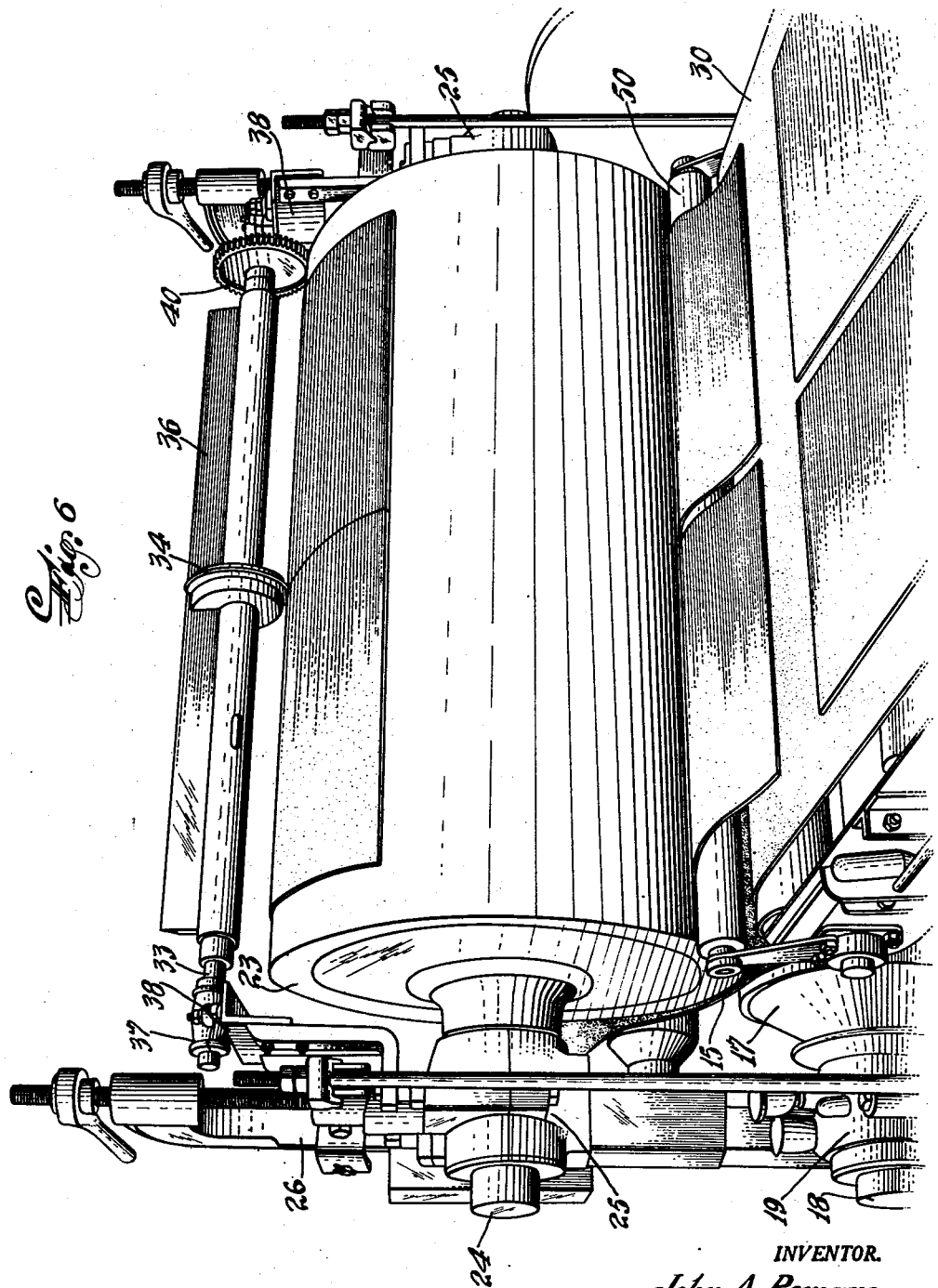
Fig. 6 is a perspective view of the front part of the machine and shows the relationship of parts and the units being stripped and conveyed from the accumulator roll.

This invention is illustrated in connection with apparatus for producing wet boards or asbestos-cement stock for shingles from a mixture consisting essentially of asbestos fibers and cement which is transferred to an endless belt in the form of a relatively thin continuously formed web. This wet web of asbestos fibers and cement mix is transferred from said belt and accumulated on a roll until the desired thickness of wet mix is produced.

As shown in the drawings, this apparatus consists essentially of one and preferably two vats or tanks 10 containing therein an aqueous slurry which consists essentially of water, fibers, such as asbestos fibers, and a cementitious or bonding material, such as cement. This slurry may be fed continuously to said tanks 10 from a discharge hopper 11 connected to a mixing chamber (not shown) where said slurry is produced. Rotatably mounted in each of said tanks 10 is a drum 12 having a cylindrical periphery of fine wire mesh fabric 13. A predetermined section of each of said drums is subjected to vacuum to cause the fiber and cement mix to adhere to screen 13 in the form of a thin layer which is carried out of the slurry in the vat and continuously deposited on a face of an endless band 15.

The endless band 15 is supported by a plurality of drums and rollers, with a drum 16 located just above each of the screens 13 and a drum 17 located at the forward part of the machine. The drum 17 is keyed to a shaft 18 horizontally supported by upstanding supporting brackets 19. Also keyed to shaft 18 is a sprocket 20 meshing with a drive sprocket 21 keyed to the drive shaft of an electric motor 22. An accumulator drum or roll 23 is carried by a shaft 24 horizontally disposed and journaled in bearings carried by a pair of supports 25. The supports 25 are mounted for sliding vertical movement on standards 26. The roll 23 is mounted directly above the drum 17.

The endless band 15 disposed in the path shown in the drawings, has a reach thereof extending along a portion of the under face of the accumulator roll 23. An endless band conveyor 30 has one end thereof located adjacent the lower part of roll 23.

In operation of the aforedescribed apparatus which is of the type heretofore used in the preparation of the wet stock or board, a thin layer of wet asbestos fiber-cement mixture is continuously formed on the rotating screens 13 and deposited on the continuously moving band 15. As the continuously moving band 15 passes the rotating accumulator roll 23, this layer of material is continuously transferred or wound on said roller.

According to this invention, I provide a device, which may be readily coupled with existing machines of the type aforesaid, to cut the layers as the wet board or stock is being formed or built up on the accumulator roll 23. For this purpose I employ a shaft 33 having keyed thereto at about the mid-length thereof a transversely disposed disc cutter 34. Also rigidly secured to said shaft 33 is an elongated cutter 36 disposed along the length of said shaft. If desired, the cutter 36 may be adjustably mounted on a plate carried by the shaft 33 so that its cutting edge may be moved towards or away from the longitudinal axis of shaft 33. The outer periphery of said disc and elongated cutters 34 and 36 are preferably in the same cylindrical plane of roughly single diameter. Each end of the shaft 33 is mounted in a bearing 37 carried by vertically adjustable bracket 38 supported by the slideable support 25. Keyed to the shaft 33 near one end thereof is a sprocket 40 meshing with a sprocket 41 keyed to an idler shaft 42 carried by one of the brackets 39. Also keyed to shaft 42 is a sprocket 43 driven by chain 44 coupled therewith and with sprocket 45 keyed to accumulator roll shaft 24. The relationship between these various sprockets is such that for each revolution of shaft 24, the shaft 33 makes a plurality of and preferably four complete revolutions. In the embodiment of the invention as illustrated, all three axes 18, 24 and 33 are in approximately the same straight line. Disposed between the receiving end of the conveyor 30 and the lower part of roll 23 is an idler roll 50 which is constantly maintained against the forward side of the stock as it is being built up on roll 23.

In operation as the thin layer of the wet mix of asbestos fibers and cement is automatically transferred from the continuously moving band 15 to the continuously rotating accumulator drum 23 so as to be spirally wound thereon, the continuously rotating shaft 33 continuously rotates the dual cutter consisting of cutters 34 and 36.

The cutter 34 is always maintained in contact with the wet mix on roll 23 to cut the same circumferentially. For each complete revolution of the roll 23, the longitudinal cutter 36 is moved to operable cutting position four separate times. Thus, while the cutter 34 is always in cutting and operable position, the cutter 36 is swung to operative and cutting position upon each quarter revolution of the roller 23. Thus each layer wound on roll 23 is cut circumferentially along the same line and longitudinally on the same four lines, each spaced about 90° from each other. The line of cutting of the cutter 36 is in the same plane as the longitudinal axis of the shafts 33 and 24 and this plane is substantially at right angles to the horizontal. After about eight to ten laps or plies of said wet mix has been accumulated thereon, the wet board or stock which now is of the proper thickness and has been cut transversely and longitudinal into units of the same and desired size, these units may be readily stripped therefrom and fall over the idler roll 50 and onto the traveling belt 30 as separate units which may be removed therefrom and stacked on skids and subjected to the next operation which may be the drying operation. The cutters 34 and 36 may be so set as to completely sever each of the individual layers of said asbestos-cement mix as it is wound around roll 23. If complete severance is not desired, these cutters may be set so that the individual layers may be scored, grooved or notched to weaken each of said individual layers along predetermined lines. In this description and claims, the terms "cut" and "cutting" are used in such sense as to include complete severance, as well as partially cutting, such as by scoring, notching or grooving the stock to weaken the same.

The accumulator roll 23, which is of comparatively large diameter is essentially an idler roll free to rotate and to be moved vertically up and down on the supporting stands 26. The accumulating roller 23 is driven by the continuous band 15. With the novel apparatus as shown, the velocity of rotation of the accumulator roll 23 is dependent on the linear velocity of the band 15, the cutters 34 and 36 are movable vertically up and down with the accumulating roll 23 and the speed of rotation of the cutters 34 and 36 is always directly proportional to the speed of rotation of the accumulating roll 23.

Since certain changes in carrying out the above process and in the constructions set forth, which embody the invention, may be made without departing from its scope, it is intended that all matter contained in the description or shown in the accompanying drawings shall be interpreted as illustrative and not in a limiting sense.

I claim:

1. The method for producing wet asbestos-cement shingle stock comprising spirally winding around an accumulator roll a relatively thin web of asbestos-cement mix in the wet state and during said winding operation and while on said roll, cutting both longitudinally and circumferentially each individual turn of said wet web on said roll before the next succeeding turn has been completely formed on said roll, the longitudinal and circumferential cuttings of each succeeding turn being substantially in alignment with the respective longitudinal and circumferential cuttings of each subjacent turn whereby individual wet asbestos-cement shingle stock is formed on the accumulator roll.

2. The method for producing wet asbestos-cement shingle stock comprising spirally winding around an accumulator roll a relatively thin web of asbestos-cement mix in the wet state and during said winding operation and while on said roll, continuously individually cutting circumferentialy on said roll each of the turns of said wet web formed on said roll and intermittently individually cutting longitudinally on said roll each of the turns of said wet web formed on said roll, said circumferential and longitudinal cuttings of each succeeding turn being respectively substantially in alignment with the circumferential and longitudinal cuttings of each subjacent turn whereby wet asbestos-cement shingle stock is formed on said accumulator roll.

JOHN A. ROMANO.

REFERENCES CITED

The following references are of record in the file of this patent:

UNITED STATES PATENTS

| Number | Name | Date |
|---|---|---|
| 272,588 | Scott | Feb. 20, 1883 |
| 803,123 | Moxham | Oct. 31, 1905 |
| 827,123 | Walsh | July 31, 1906 |
| 1,189,650 | Armstrong | July 4, 1916 |
| 1,599,253 | Skolnik | Sept. 7, 1926 |
| 1,625,472 | Kelly | Apr. 19, 1927 |
| 1,679,351 | Dohm | Aug. 7, 1928 |
| 1,722,559 | Colbert | July 30, 1929 |
| 1,882,012 | Hires | Oct. 11, 1932 |
| 1,900,427 | Clapp | Mar. 7, 1933 |
| 2,328,109 | Thompson | Aug. 31, 1943 |

FOREIGN PATENTS

| Number | Country | Date |
|---|---|---|
| 305,750 | Germany | May 14, 1918 |